Oct. 27, 1959 M. F. KOENIG Re. 24,725

ELECTRIC SWITCHES OF THE CAM-LEVER-OPERATED TYPE

Original Filed March 5, 1956 4 Sheets-Sheet 1

Inventor
Martin F. Koenig
By W. Keyon
Attorney

ELECTRIC SWITCHES OF THE CAM-LEVER-OPERATED TYPE

Original Filed March 5, 1956 4 Sheets-Sheet 2

Inventor
Martin F. Koenig
By W. E. Ryan
Attorney

Oct. 27, 1959 M. F. KOENIG Re. 24,725

ELECTRIC SWITCHES OF THE CAM-LEVER-OPERATED TYPE

Original Filed March 5, 1956 4 Sheets-Sheet 3

Inventor
Martin F. Koenig
By W. E. Lyon
Attorney

ELECTRIC SWITCHES OF THE CAM-LEVER-OPERATED TYPE

Original Filed March 5, 1956 4 Sheets-Sheet 4

Inventor
Martin F. Koenig
By W. E. Lyon
Attorney

United States Patent Office

Re. 24,725
Reissued Oct. 27, 1959

24,725

ELECTRIC SWITCHES OF THE CAM-LEVER-OPERATED TYPE

Martin F. Koenig, Milwaukee, Wis., assignor to Cutler-Hammer, Inc., Milwaukee, Wis., a corporation of Delaware Original No. 2,868,929, dated January 13, 1959, Serial No. 569,601, March 5, 1956. Application for reissue March 9, 1959, Serial No. 798,311

8 Claims. (Cl. 200—153)

Matter enclosed in heavy brackets [ ] appears in the original patent but forms no part of this reissue specification; matter printed in italics indicates the additions made by reissue.

This invention relates to improvements in electric switches of the cam-lever-operated type for controlling electric circuits, and particularly to such switches for use in controlling circuits carrying alternating current of relatively high value.

It is frequently desired to use an over-center cam-lever type of switch of relatively small size for interrupting an alternating current circuit carrying currents of thirty amperes or more, and in which the contacts are opened and closed at a relatively slow rate. Such switches are satisfactory only if adequate provision is made to insure confinement of any arc to the area between the contacts and to guard against deflection of an arc from the stationary contacts to a neutral conductor or to ground. The switch must be enclosed in a metal case or housing which can be grounded, to meet safety requirements set by ordinances and statutes and by specification of users not subject to such ordinances and statutes.

Switches of this type are desired for single-pole, two-wire, and double-pole, three-wire circuits. To be economically practical, the case or housing must be adaptable to several sizes of this type of switch, without requiring special adapting means. As many parts as possible of each size of switch should be interchangeable and such parts should be so simplified as to be capable of manufacture by simple, or even automatic, machine operations.

The insulation for enclosing the switch contacts should provide seats, shoulders and recesses for locating all metal parts so that the movable switch parts can be properly and quickly assembled and so that even failure to exercise care in assembly or maintenance is unlikely to result in improper relationship of the electrically conductive parts.

The movable switch parts must be positively brought to "on" and "off" positions and must be retained therein against accidental movement. Simple means must be provided for retaining the switch handle in either of the two positions, and simple limit stops must be provided to avoid overtravel of movable parts even though the switch may not be maintained in mechanically perfect condition.

It is therefore one object of the present invention to provide an over-center toggle type switch for interrupting circuits of relatively high current value and in which all current conducting parts are so enclosed as to minimize the likelihood of energization of parts with which a user might come into contact.

Another object of the invention is to provide an improved switch of the aforementioned type in which the contacts are enclosed within a chamber of insulating material for confining any arcs formed between the contacts.

Another object of the invention is to provide such a switch for interrupting relatively high value currents, in which a single block of insulation provides seats and recesses for locating the conductive switch parts and for guarding the grounded metal parts against attachment of an arc thereto.

Another object of the invention is to provide a manually operated lever type of switch for interrupting alternating current circuits capable of carrying 30 amperes or more and in which the metal parts are interchangeable duplicates usable without change regardless of the number of switch poles or the number of circuit conductors.

Another object of the invention is to provide a manual lever operated type of switch for interrupting alternating current circuits of relatively high value, and in which at least the movable switch contacts may tilt in various directions to compensate for differences in level of the fixed contacts but are guided in their movement by continuous surfaces of a movable insulating block upon and within which the contacts are mounted.

Other objects and advantages of the invention will hereinafter appear.

The accompanying drawings illustrate two preferred embodiments of my invention, in which.

Figure 1:
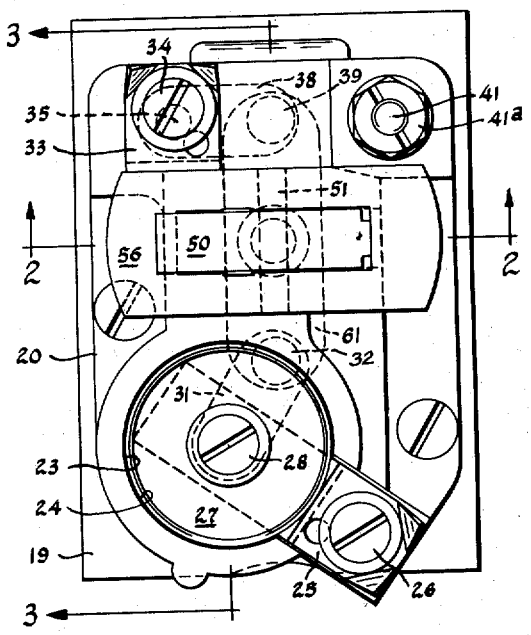
Figure 1 is a top plan view of a single-pole, two-wire, switch constructed in accordance with my invention.
Figure 2:
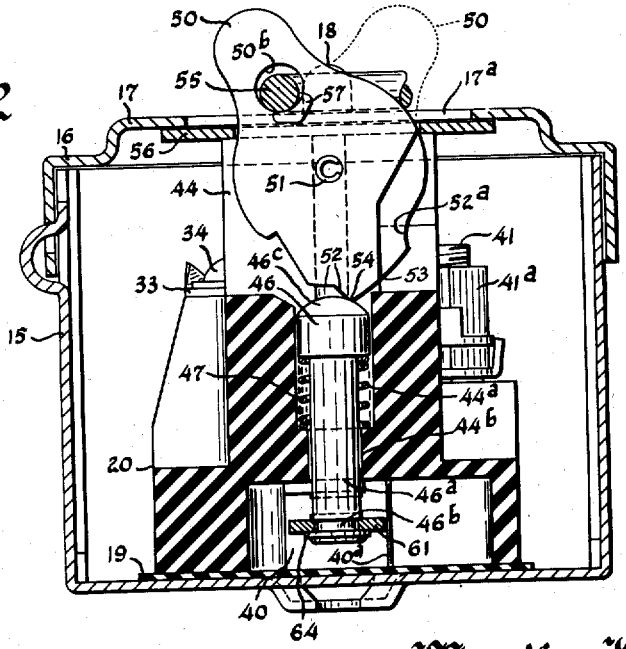
Fig. 2 is a transverse cross-section, on the broken line 2—2 of Fig. 1; looking in the direction of the arrows, and showing the switch of Fig. 1 mounted in a casing and with the movable switch contacts about to reach the "on" position; the position of the handle when the switch is in the "off" position being indicated in dotted lines.
Figure 3:
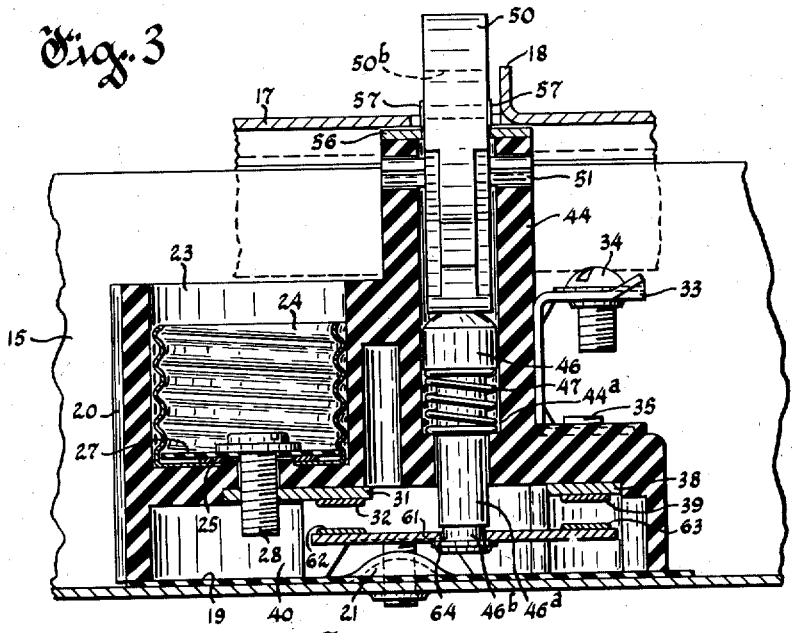
Fig. 3 is a longitudinal sectional view, along the broken line 3—3 in Fig. 1, with the movable contacts in the "off" position.
Figure 5:
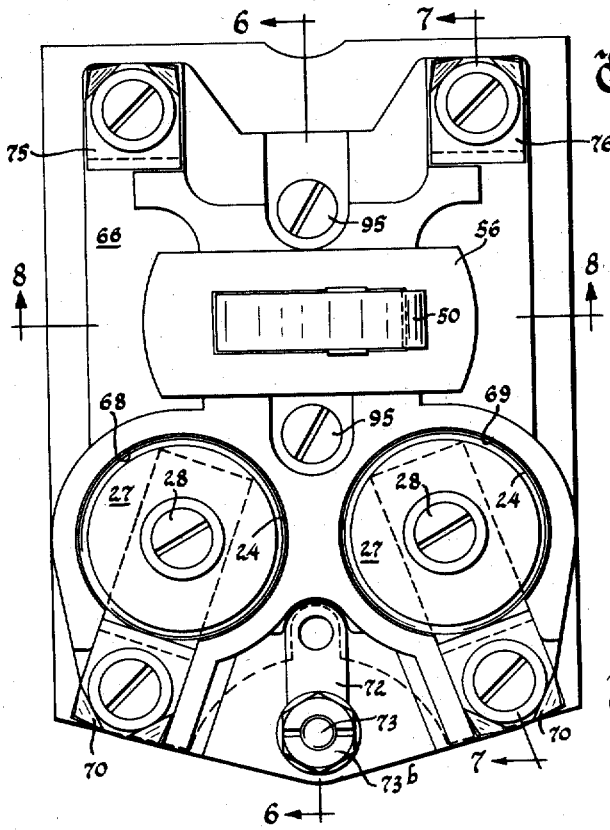
Fig. 5 is a top plan view of a switch embodying the present invention and adapted for use with a two-pole, three-wire, circuit.
Figure 7:
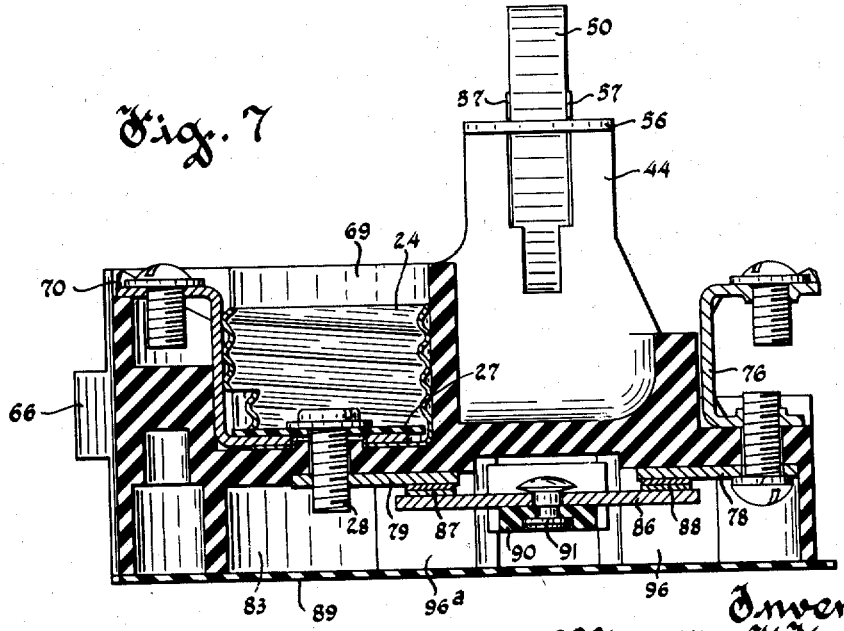
Fig. 7 is a longitudinal sectional view, along the broken line 7—7 of Fig. 5.
Figure 8:
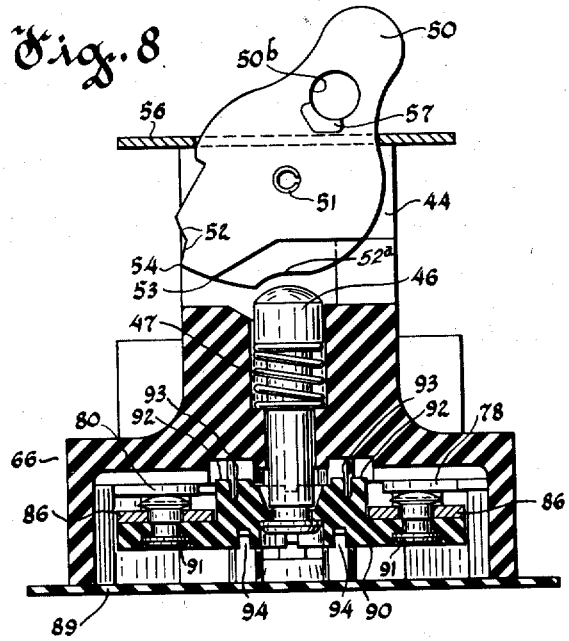
Fig. 8 is a transverse sectional view, on the line 8—8 of Fig. 5, and looking in the direction of the arrows.
Figure 9:
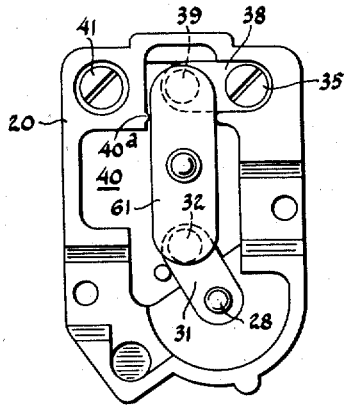
Figure 10:
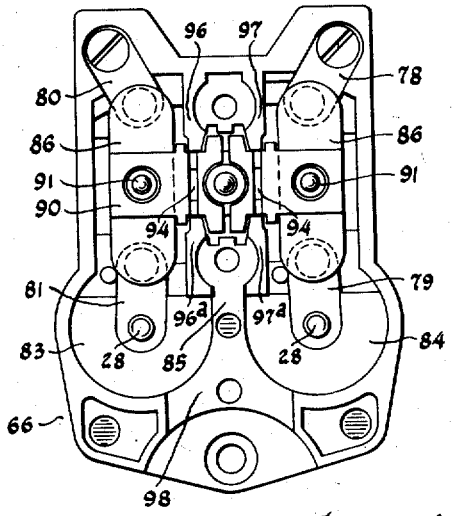

Fig. 9 is a bottom plan view of the switch illustrated in Figs. 1, 2 and 3, showing the location and relationship of the stationary contacts with respect to the base and of the contact bridge with respect to the base and to the stationary contacts; and Fig. 10 is a bottom plan view of the switch illustrated in Figs. 5 through 8 to show the location and relationship of the stationary contacts to the base and the relationship of the bridging contactor to the base and to the stationary contacts.

Referring to the drawings by numerals applied to the several parts, 15 (see Fig. 2) designates a casing, shown as fabricated from sheet metal, of generally rectangular form, with one open side to be closed by a formed sheet metal door 16 hinged to casing 15, by a plurality of hinge parts formed integrally with the casing and cover, for completely enclosing the active switch parts to be described. The door has an upwardly offset panel portion 17 with a transverse slot 17[a] therein, and an integral lug 18 extends outwardly from one side of the slot when the door is closed, as best illustrated in Fig. 3, for coaction with the hasp of a padlock or the like to be used with the switch handle, for locking the switch in either its "on" or its "off" position, in the manner illustrated in Fig. 2. The sub-assembly forming the switch itself is mounted in spaced relation to the side and end walls of the casing 15—18 and includes a plate or sheet of insulating material 19 on which is placed a base block 20 of electrical insulating material. The base block 20 has recesses formed in the bottom surface thereof, and the plate 19 has bosses 21 fitting into the base block recesses and both the block 20 and bosses 21 are provided with apertures for passage of fastening screws through the block and plate into engagement with threaded openings in the bottom wall of the casing. Thus the plate 19 and block 20 are keyed together and may be readily positioned in and attached to the bottom wall of the casing; the block 20 being spaced at the sides and top from the casing 15. Casing 15—18 is adapted to receive various modifications of the present switch for single-pole or double-pole and two-wire or three-wire circuits.

The switch base block 20 is of approximately rectangular form and is preferably molded to the form illustrated from a synthetic resinous electrical insulating and heat resistive material, such as "Bakelite," which can be accurately molded to a particular shape. Therefore it is possible to provide the base block with apertures, recesses and passages and to form therein or thereon seats or shoulders and a pedestal for, respectively, receiving and retaining the electrically conductive fixed parts and the movable parts of the switch, in given spatial relationships. Thus, Fig. 1 shows a switch for a single-pole two-wire circuit with means for connecting a neutral conductor.

A recess 23 (see Figs. 1 and 3) is formed in the switch base block 20 and has an electrically conductive screw-threaded liner or shell 24 for receiving a fuse plug (not shown). The liner is conductively connected with a first terminal 25, comprising a strip of copper or the like bent to approximately Z-shape, which terminal is provided with the usual conductor attaching screw 26. The portion of terminal 25 to which the conductor is to be attached seats in a notch in the base block 20 and the terminal extends downwardly alongside of shell 24 and inwardly over the bottom wall of said shell. A flat punched disk 27 of insulating material seats upon the bottom wall of shell 24 and a screw 28 extends through the insulating disk 27 and the lower portion of terminal 25. The screw 28 threadedly connects with a stationary contact bar 31 carrying a contact tip 32 of metal resistive to corrosion and to the effects of electric arcing. The contact bar 31 is preferably rounded at opposite ends thereof and one end portion thereof is seated in a notch in the base block 20 for holding the bar and its contact in a given position in the base block when the connecting screw 28 is turned tight to retain the fuse recess liner 24, the terminal 25 and the disk of insulation 27 in fixed position, as shown in Figs. 1 and 3.

A second terminal 33 of substantially U-shape and provided with a conductor attaching screw 34 is mounted in a seat therefor in the base block 20 at the end of the block remote from the fuse receptacle recess 23 and is held on the base block by a terminal mounting screw, the shank end of which is shown at 35 in Fig. 3, and in dotted lines in Fig. 1. The shank of screw 35 likewise extends with clearance through a second contact bar 38 which has a contact tip 39; the contact bar 38 and its tip 39 being shaped like the contact bar and tip 31, 32 and being also seated in a suitably shaped notch or recess in the base block 20, as shown in Fig. 9. The contact bar 38 (Fig. 3) need not have a threaded opening therethrough because the terminal 33 has a threaded aperture to receive the shank of terminal mounting screw 35. The several contact bars and tips 31, 32 and 38, 39 are so located as to bring the contacts 32 and 39 into alinement and into substantially the same plane within a recess 40 extending upwardly from the lower surface of base block 20, such recess being defined by side walls which form a substantially enclosed chamber for the stationary contacts and a movable bridging contactor 61 hereinafter described.

A bolt or screw 41 extends upwardly through the base block 20, and preferably takes into two or more nuts, one of which is shown at 41a in Fig. 1, for attachment thereto of a neutral conductor if such conductor forms a part of the circuit with which the present switch is used. The metal casing 15 and cover 17 are preferably grounded.

A pedestal 44 is formed integrally with the base block 20 and extends outwardly therefrom intermediate the ends of said block and on the same, or upper, side thereof as the fuse receptacle 23, 24, first terminal 25, 26 and second terminal 33—34—35, to provide a cylindrical recess 44a and a slotted portion 44b, as shown in Fig. 2, for jointly accommodating the means carrying and operating a bridging contactor. A plunger, preferably formed of metal, with a piston-like enlargement 46, is reciprocatable within the cylindrical recess 44a in the pedestal 44 and has a reduced end portion 46a thereof extending through a passageway 44b, Fig. 2, into the insulation chamber 40 for movement therein. A helical compression spring 47 seats at one end in the recess 44a and seats at its other end against the inner end of the piston-like portion 46 of said plunger. It will be noted that the wall of the recess 44a and the passageway 44b extending therefrom into the base block recess 40, are continuous, or not interrupted, and therefore form adequate guiding surfaces for the plunger and the spring even though the pressure on the plunger may not be along its axis and might otherwise tend to jam the plunger in the recess 44a.

The upper end of the plunger portion 46 has a convex surface 46c for action thereon of an operating handle member 50 pivoted at 51 in the slotted portion of the pedestal 44. The handle 50 has two surface portions 52, 53 at its lower end for cooperative engagement with the upper end 46c of the piston-like enlargement 46; said portions 52 and 53 acting as cams on the plunger and against the reaction of spring 47, the cam surface 52 acting to compress the spring 47 to effect disengagement of bridging contactor 61 from contact tips 32 and 39, whereas the cam surface 53 acts to allow such spring to expand to provide for bridging engagement of contactor 61 with contact tips 32 and 39. The two surface portions 52, 53 are separated by a relatively sharp point 54 which, when it is moved clockwise (Fig. 2) past the center of the convex surface 46c, serves to automatically provide for a quick movement of the bridging contactor from the circuit-interrupting position (Fig. 2) to the circuit-completing position. The cam depression 52 provides for retention of lever 50 in circuit-interrupting position; whereas the depression 52a provides for retention of lever 50 in circuit-completing position, pending manual movement of said lever toward its opposite extreme position.

The handle may be locked in either end position by use of suitable means, such as a padlock hasp 55, passing through an aperture 50b in the handle and engaging with either side edge of the casing lug 18.

The handle 50 extends through a plate 56, preferably of punched sheet metal, resting loosely on the pedestal 44 and which is formed with a preferably rectangular slot through which the handle extends. The handle is provided with relatively short, substantially V-shaped lateral projections 57 on opposite sides thereof and adjacent to opposite ends of, and below, the aperture 50b therethrough.

Figure 6:
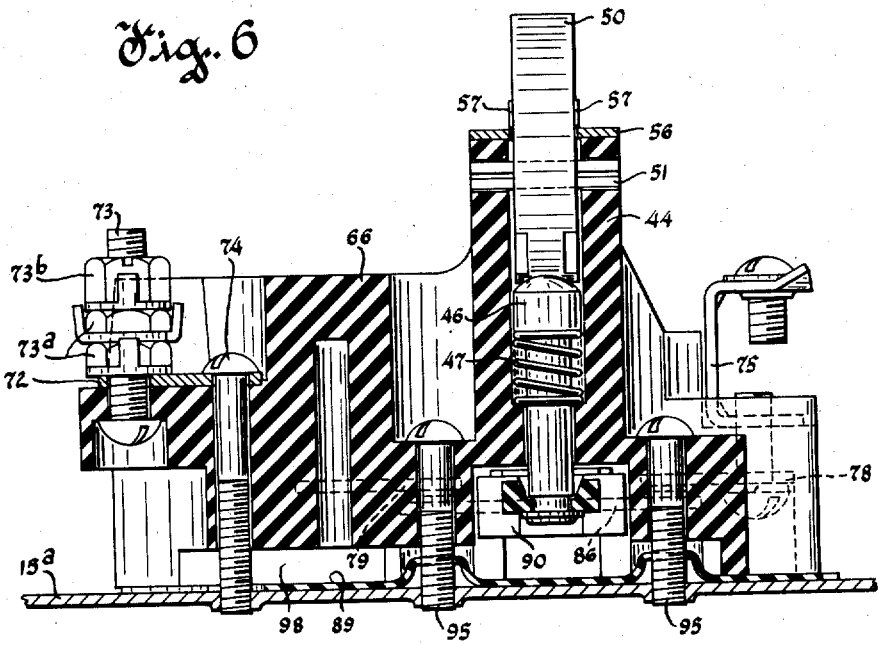
Fig. 6 is a central longitudinal sectional view, on the line 6—6 of Fig. 5, the movable contacts being shown, herein and in succeeding figures, in the "on" position thereof.

In practice the tubular pivot pin 51 for lever 50 is adapted for a press fit within the opening 50c in said lever; but having a free rotary fit within [aline] *alined* bearing openings provided in the pedestal, as shown in Figs. 3 and 6.

Figure 4:
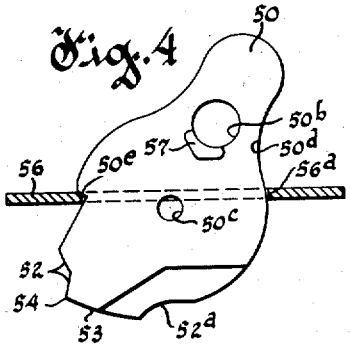
Fig. 4 is a somewhat diagrammatic view showing of one step in the assembly of a plate and the operating handle of the switch.

Prior to assembly of lever 50 in proper relationship to pedestal 44 (as shown in Figs. 2, 3, 6 and 8) the metal plate 56, which has said rectangular opening 56[a] (Figs. 4 and 5) of less length than the greatest diameter of the substantially circular intermediate portion of said lever, is "woven" through said opening 56[a] in the manner illustrated in said Fig. 4. Thus it will be apparent that lever 50 may be moved clockwise (downwardly through the opening 56[a]) toward the relatively narrow handle portion 50[d] thereof, Fig. 4, whereupon the downwardly facing shoulder 50[e] on said handle may be moved toward the right, to clear the left-hand end of said opening 56[a]; whereupon the integral lugs 57, 57 on opposite sides of handle 50 will rest upon the upper surface of plate 56.

As will be noted in Figs. 3 and 8, when the pivot pin 51 and handle 50 are finally assembled with respect to pedestal 44, the lugs 57, 57 will act to positively prevent removal or displacement of plate 56 from the other parts of the assembly.

The reduced end portion 46[a] of plunger 46 which extends into the chamber 40 in the base block 20 carries a bridging contactor 61 with contact tips 62, 63 thereon. The bridging contactor 61—63 is attached to the lower end of the reduced portion 46[a] of the plunger as by providing a further reduced portion 46[b] to loosely accommodate the central opening in bridging contactor 61 (Figs. 2 and 3); a washer 64 being strung upon the portion 46[b], and the lower end of portion 46[b] is then upset or spun over washer 64, as shown, in a manner to allow some self-adjusting movement thereof with respect to the stationary contacts. Thus contactor 61 may tilt either longitudinally or transversely of the block for engagement with the stationary contacts 32, 39 regardless of slight variations in the plane of such contacts due either to manufacturing inaccuracies or to wear of contacts.

Figs. 2 and 9 show a small partition 40[a] extending from one side of the recess 40 and throughout the depth of the latter, but affording such tilting of the bridging contactor either longitudinally or transversely of the latter as may be necessary to compensate for variations in the level of the stationary contacts 32 and 39. Hence the contactor 61 cannot move out of the line of travel required for its engagement with both of the stationary contacts 32 and 39.

In use of the present construction, movement of the handle 50 from its extreme right-hand position to the left-hand position thereof as shown in Fig. 2, brings the cam surface 52 into place (as soon as the sharp point 54 of the cam passes over the high point of the plunger piston 46), so that the spring 47 is kept compressed and the plunger 46, 46[a] and the bridging contactors 61—63 are held down for maintaining interruption of the circuit previously completed between the stationary contacts 32 and 39 by said bridging contactor. When the handle 50 is moved to the right until the cam surface 53 engages the surface 46[c] of the plunger 46, the spring 47 is free to expand and the plunger 46 is lifted to carry the bridging contactor 61—63 toward the stationary contact tips 32 and 39 to close the circuit. Movement of the bridging contactor 61—63 during opening movement thereof is relatively slow so that a 60-cycle alternating current passes through zero several times during the movement of the contactor to circuit interrupting position.

Figs. 5 through 8 and 10 illustrate a double-pole, and/or three-wire, switch constructed in accordance with the present invention, in which many of the parts are identical with corresponding parts aforedescribed; and only those parts which have a significant structural difference will require further description. The base block 66 is substantially larger than the block 20 aforedescribed, to provide two recesses 68 and 69, each of which has therein a threaded liner 24 connected with a terminal, the sets of liners 24 and terminals 70 being held in position by insulating disks 27 and screws 28, 28, which respectively engage with one of the stationary contacts of the switch as aforedescribed. However, the outer ends of terminals 70, 70 are spread apart to provide space for another terminal 72 and a terminal screw 73 to which a neutral conductor may be connected, as by means of one or more nuts 73[a], 73[b], and through which the neutral conductor can be electrically connected by means of a bolt or screw 74 (see Fig. 6) to the casing 15[a]. Two terminals 75 and 76 are also provided at the other end of the base block 66 and are of substantially U-shape, and held in place in the manner previously described.

Each fuse receptacle terminal screw 28, 28 is connected with its own stationary contact and each terminal 75, 76 is also connected with its own stationary contact, so that two pairs of stationary contacts are now provided. One pair of such contacts is designated 78, 79 and is shown in Fig. 7, while Fig. 8 shows the contact 78 and one contact 80 of another pair of stationary contacts similar to the pair 78, 79.

The base block 66 has two recesses (see Fig. 10) in each of which one pair of stationary contacts is mounted and such recesses are in part defined by a partition 85 which does not, however, completely isolate the recesses from each other. Each pair of stationary contacts has associated therewith a bridging contactor similar to that aforedescribed, comprising a bar 86 and a pair of contact tips 87, 88, as shown in Fig. 7. The two bridging contactors are mounted at the ends of a contact carrier 90 formed of insulating material; the mounting providing for relative movement between the several bridging contactors and the insulating carrier 90 as by use of specially formed rivets, one of which is shown at 91 in Fig. 7. The insulating carrier 90 for bridging contactors 86, 86 is also loosely mounted to the end of the plunger 46 as previously described. Hence, there are three relative movements between the plunger 46 and the contactor carrier 90, and two relative movements between each of the bridging contactors 86, 86 and the carrier 90, which thus afford a sort of universal joint action, to compensate for variation in the plane of the contact surfaces of the two stationary contact tips of each pair, as well as between the planes of the two pairs of stationary contacts, whether such variations are due to the original manufacture or due to differences in the degree of wearing of the contact tips during use. It will be noted in Figs. 8 and 10 that the contactor carrier 90 is formed with extensions 92 and with grooves 93 therebetween on the one side of such contactor carrier, and with grooves 94 on the other side thereof, to increase the creepage distance between the bridging contactors 86 and 86 and to avoid any possibility of electrical energization of the piston 46 and the spring 47.

In the present construction, the switch sub-assembly is to be attached within a casing, substantially like the casing 15—18 aforedescribed, but of necessarily larger dimensions, by a pair of screws 95 passing through the base block 66 and taking into tapped openings in the bottom wall of said casing, as illustrated. The assembly screws pass through the partition 85 between the base block recesses 83, 84 and the portion of such screws extending between the edge of the partition and the insulation plate 89 are guarded by partial walls 96, 97 and 96[a], 97[a] (Fig. 10). The distance at any time between any of the energized contacts and the assembly screws, will be greater than the distance between the stationary and movable contacts themselves so that the assembly screws are effectively guarded against the establishment of a short circuit thereto and the grounding of any one of the contacts.

The sets of guard walls 96, 97 and 96[a], 97[a] severally engage along one of their edges with one of several notches in the insulating contactor carrier 90 to prevent any substantial degree of rotation of said carrier and the contactors carried thereby relative to the stationary contacts.

The present construction is advantageous to the installing electrician and to the user in addition to those advantages previously expressed. Thus, the one-piece molded insulating block is inherently resistant to breakage and is massive and especially free from thin sections which could be readily damaged during installation or in use. The casing requires only three screws for mounting thereof, outside [are] *the* area of the base block, and the base block is mounted by use of only two screws engaging the casing and holding the base insulation plate 89 in place. Adequate space is provided between the enclosing [ceasing] *casing* and the base block for connecting the leads with a minimum of bending and the terminals for the leads are all located on a readily accessible base surface. The contacts are of the butt type for "face-to-face" closing which minimizes wear and the contact mechanisms are of the "double-break" type which minimizes electrical wear per contact and increases contact life. The switch is positively opened by the camming action of the toggle lever and is closed by action of the spring 47. The spring 47 does not carry current and cannot be heated, so that the spring characteristics will not change.

I claim:

1. A manually operated switch for making and breaking [at least thirty amperes] alternating current electric circuits, comprising a molded insulating base block having a recess formed in the inner surface thereof and having a pedestal projecting from the outer surface thereof, said pedestal having a passage extending therethrough and opening into said recess, plural electric terminals on the base block, plural stationary contacts on the base block, the terminals and the contacts being joined for electric conduction and held in fixed position relatively to the base block, a *metal* plunger reciprocatable within the base block passage and extending into said inner recess, a spring interposed between an annular wall portion of said passage and an enlarged outer end portion of said plunger for normally biasing the latter toward its outer extreme position, a molded insulating cam-type handle pivotally supported upon the base block pedestal and having a cam portion thereof engageable with the enlarged outer end portion of said plunger to cause movement thereof in the opposite direction against said bias, and a bridging contactor tiltably attached to the inner end of the plunger within the base block recess for movement into and out of engagement with the stationary contacts upon movement of the handle in opposite directions respectively.

2. A manually operable cam-actuated switch for making and breaking alternating current electric circuits [of at least thirty amperes rating,] comprising a molded insulating base block having a recess in the inner surface thereof and having a pedestal formed integrally therewith and projecting from the outer surface thereof, said pedestal having a passage extending therethrough and opening into said recess, plural electric terminals on the base block, plural stationary contacts on the base block, the terminals and the contacts being joined for electric conduction and held in fixed position relatively to the base block, a metal plunger movable in the base block passage and extending into said inner recess, a spring interposed between an annular wall portion of said passage and an enlarged outer end portion of said plunger for normally biasing the latter toward its outer extreme position, a molded insulating handle pivotally mounted on the base block pedestal and having a cam portion engageable with said plunger to cause movement thereof in the opposite direction, a metal plate resting on the base block pedestal and having a slot therein to accommodate the handle, the handle having integral projections on opposite sides thereof overlying said plate to positively prevent removal of the latter, and a bridging contactor attached to the end of the plunger within said base block recess for movement into and out of contact with the stationary [contracts] *contacts* upon oscillation of the handle.

3. A manually operable cam-actuated switch for making and breaking alternating current electric circuits [of at least thirty amperes rating,] comprising a box-like metallic casing having a slot in one side thereof, a molded insulating base block having a recess in the inner surface thereof and having a pedestal formed integrally therewith and projecting from another side thereof, said pedestal having a passage extending therethrough and opening into said recess, plural electric terminals on the base block, plural stationary contacts on the base block, the terminals and the contacts being joined for electric conduction and held in fixed position relatively to the base block, a metal plunger movable in the base block passage and extending into said recess, a coiled compression spring interposed between an annular wall portion of said passage and the enlarged outer end portion of said plunger for normally biasing the latter in one direction, and a molded insulating handle member pivotally mounted on the pedestal and extending through the slot in the casing wall, the handle having cam surfaces for acting on the plunger to provide for movement of the latter to either of its extreme positions selectively.

4. A manually operable cam-actuated switch for making and breaking [thirty ampere] alternating current electric circuits, comprising a molded insulating base block having a recess therein and having a passage therethrough connected with said recess, a plurality of electric terminals seated on the base block, a plurality of pairs of stationary contacts seated on the base block and joined for electric conduction with the respective terminals and for holding the terminals and the contacts in fixed positions relatively to the base block, a metal plunger reciprocatable in the base block passage and extending into said recess, a molded insulating carrier member attached to the end of the plunger within said recess and having a predetermined degree of lost motion relatively to the plunger, a plurality of bridging contactors permanently attached to said carrier and each having a predetermined degree of lost motion with respect thereto, said bridging contactors being adapted for movement thereof jointly into and out of engagement with the respective pairs of stationary contacts, and manually operable cam means of molded insulating material acting on the plunger at will for effecting disengagement of said bridging contactors from, or effecting engagement thereof with, the respective sets of stationary contacts.

5. In an electric switch mechanism, in combination, a unitary molded insulating base block having a pedestal formed integrally therewith, said pedestal having a flat upper end, said pedestal also having a recess formed therein and opening to said upper end thereof, said recess having a pair of parallel walls, a molded insulating lever having parallel side surfaces adapted to fit freely between the parallel walls of said recess, said lever having a relatively narrow handle portion and a substantially wider body portion therebelow, said lever having a relatively small opening of circular form extending transversely therethrough at a preselected point in the length thereof, the side edges of said wider portion jointly aligned with said relatively small opening being in the form of segments of a circle centered at said relatively small opening, the parallel walls of said base block recess having transversely alined circular openings formed therein of slightly larger diameter than said handle opening, and a pivot pin freely insertable into the openings in said parallel walls to provide for rotation of [said] *its* end portions within said openings, but said pivot pin having a drive fit thereof within said handle opening, whereby said handle is retained in pivotally supported relationship to said parallel walls.

6. In a switch mechanism like that defined by claim 5, the combination wherein said insulating lever is provided with alined, integral lateral projections on the respective parallel surfaces thereof, of a sheet metal plate overlying the flat upper end of said pedestal and having a rectangular opening formed therein to accommodate said lever for oscillatory movement after assembly of said parts with respect to said pedestal, said lateral projections on said lever acting to positively prevent displacement of said plate from said pedestal and said lever.

7. In a switch mechanism like that defined by claim 6, the combination wherein the length of the opening in said metal plate is less than the diameter of the enlarged portion of said lever along a bisecting line extending medially through the pivotal center of said lever, but wherein said lever is provided below said bisecting line with an inwardly offset portion, whereby one end wall of said plate opening may be freely moved toward the narrower upper end portion of said lever to thereupon permit clearance of the other end wall of said plate opening with respect to said inwardly offset portion of said lever.

8. In an electric switch mechanism like that defined by claim 6, the combination therewith of a relatively thin insulating base plate having bosses extending from one face thereof, the molded insulating base block having recesses formed therein for receiving the base plate bosses for positioning the base plate relatively to the base block, said base plate having openings extending through said bosses and said base block having openings alined with the openings in said base plate, and threaded members extending through said openings in the base block and threaded into said openings in said base plate, thereby providing means for retaining said base block and said base plate in assembled relation.

UNITED STATES PATENTS

References Cited in the file of this patent or the original patent

| | | |
|---|---|---|
| 1,909,641 | Watts | May 16, 1933 |
| 2,315,262 | Lefebre | Mar. 30, 1943 |
| 2,366,474 | Bentley | Jan. 2, 1945 |
| 2,626,335 | Landin | Jan. 20, 1953 |
| 2,747,034 | Machon et al. | May 22, 1956 |